(12) United States Patent
Cui et al.

(10) Patent No.: US 11,462,984 B2
(45) Date of Patent: Oct. 4, 2022

(54) LINEAR VIBRATION MOTOR

(71) Applicant: AAC Technologies Pte. Ltd., Singapore (SG)

(72) Inventors: Zhiyong Cui, Shenzhen (CN); Yun Tang, Shenzhen (CN); Jie Ma, Shenzhen (CN); Yao Wang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 166 days.

(21) Appl. No.: 16/994,657

(22) Filed: Aug. 17, 2020

(65) Prior Publication Data

US 2021/0021185 A1     Jan. 21, 2021

Related U.S. Application Data

(63) Continuation of application No. PCT/CN2019/096381, filed on Jul. 17, 2019.

(51) Int. Cl.
*H02K 33/02* (2006.01)
*B06B 1/04* (2006.01)
(Continued)

(52) U.S. Cl.
CPC ............. *H02K 33/02* (2013.01); *B06B 1/045* (2013.01); *H02K 5/04* (2013.01); *H02K 41/0354* (2013.01)

(58) Field of Classification Search
CPC ...... H02K 33/02; H02K 5/04; H02K 41/0354; H02K 1/34; H02K 41/0356; B06B 1/045
See application file for complete search history.

(56) References Cited

U.S. PATENT DOCUMENTS

| | | | | |
|---|---|---|---|---|
| 2013/0342034 A1* | 12/2013 | Moon | ............ | B06B 1/045 310/25 |
| 2016/0226362 A1* | 8/2016 | Wang | ............ | H02K 33/16 |
| 2021/0091648 A1* | 3/2021 | Jin | ............ | H02K 7/065 |

FOREIGN PATENT DOCUMENTS

| CN | 203939762 U | * 11/2014 | ......... F04D 25/062 |
|---|---|---|---|
| CN | 204733057 U | * 10/2015 | |

(Continued)

OTHER PUBLICATIONS

JPH11178304AEnglishtranslation (Year: 2022).*
(Continued)

*Primary Examiner* — Tulsidas C Patel
*Assistant Examiner* — Viswanathan Subramanian
(74) *Attorney, Agent, or Firm* — W&G Law Group (57) ABSTRACT

The present invention provides a linear vibration motor, including a housing having an accommodating space, a vibrator disposed in the accommodating space, and a coil fixed in the housing and driving the vibrator to move. The vibrator includes a magnetic circuit system. The linear vibration motor further includes a restoring assembly fixed to the housing. The restoring assembly is made of magnetic steel and is magnetized along a direction perpendicular to a direction in which the vibrator moves. Compared with an existing spring structure, in the linear vibration motor of the present disclosure, a magnetic interaction force is formed between a restoring assembly and a vibrator to restore a vibrator. In this way, an anti-humidity and anti-high-temperature effect of the restoring assembly is improved by replacing an interaction force of a spring with a magnetic interaction force.

9 Claims, 6 Drawing Sheets

(51) Int. Cl.
*H02K 5/04* (2006.01)
*H02K 41/035* (2006.01)

(56) References Cited

FOREIGN PATENT DOCUMENTS

| CN | 105896798 | A | * | 8/2016 | ............. H02K 33/18 |
| CN | 108512387 | A | * | 9/2018 | |
| JP | 11178304 | A | * | 7/1999 | |

OTHER PUBLICATIONS

CN203939762UEnglishtranslation (Year: 2022).*
CN204733057UEnglishtranslation (Year: 2022).*
CN105896798AEnglishtranslation (Year: 2022).*
CN108512387AEnglishtranslation (Year: 2022).*

* cited by examiner

LINEAR VIBRATION MOTOR

TECHNICAL FIELD

The present disclosure relates to the technical field of vibration motor, in particular a linear vibration motor.

BACKGROUND

An existing linear motor has a solid metal spring as a support structure to connect a vibrator and a stator. There are a many types and styles of spring structures, where the spring mainly has a function of supporting the vibrator and providing restoring force.

The structure of an existing linear motor has at least following three problems: 1). since a solid metal spring can bear limited stress, a limited displacement of a vibrator cannot cause a strong vibration; 2). a metal spring has an issue of reliability in terms of high temperature and high humidity; 3). a solid spring generally has a complex structure and requires welding or gluing, which would occupy some space in a device.

SUMMARY

The present disclosure provides a linear vibration motor to solve the problem that a solid spring has a complex structure and requires welding or gluing that would occupy some space in a device.

The technical solutions of the present disclosure is as follows. A linear vibration motor including a housing having an accommodating space, a vibrator disposed in the accommodating space, and a coil fixed in the housing and driving the vibrator to move. The vibrator includes a magnetic circuit system. The coil is wound on an outside of the magnetic circuit system and is relatively spaced apart from the magnetic system. The magnetic circuit system includes a first magnetic steel and a second magnetic steel that are fixedly connected, The first magnetic steel and the second magnetic steel are magnetized in a moving direction of the vibrator, the first magnetic steel and the second magnetic steel have identical magnetic poles on their sides opposite to each other. Herein, the linear vibration motor further includes a restoring assembly fixed to the housing. The restoring assembly magnetizes the magnetic steel in a direction perpendicular to a direction in which the vibrator moves. The restoring assembly has a magnetic pole facing the vibrator, the magnetic pole being identical with the magnetic poles on the opposite sides of the first and second magnetic steels. A magnetic interaction force between the restoring assembly and the magnetic circuit system provides a restoring force for the vibrator.

As a development, the restoring assembly is a ring magnetic steel disposed at one or both sides of the coil and arranged as surrounding the vibrator.

As a development, the restoring assembly includes a first restoring member and a second restoring member that are disposed on one side of the coil and that are respectively located on both sides of the magnetic circuit system. The first restoring member and the second restoring member have identical magnetic poles on their sides opposite to each other, the magnetic poles on the opposite sides of the first restoring member and second restoring member are identical with the magnetic poles on the opposite sides of the first magnetic steel and second magnetic steel.

As a development, the restoring assembly further includes a third restoring member and a fourth restoring member that are disposed on the other side of the coil and that are respectively located on both sides of the magnetic circuit system. The third restoring member and the fourth restoring member have identical magnetic poles on their sides opposite to each other, the magnetic poles on the opposite sides of the third restoring member and fourth restoring member are identical with the magnetic poles on the opposite sides of the first magnetic steel and second magnetic steel.

As a development, the magnetic circuit system further includes a pole core fixed between the first magnetic steel and the second magnetic steel.

As a development, the housing includes a first end plate and a second end plate that are disposed opposite to each other in the moving direction of the vibrator, an optical axis is installed between the first end plate and the second end plate, the optical axis disposed in the moving direction of the vibrator, and the vibrator is sleeved on the optical axis and moves along the optical axis.

As a development, the vibrator further includes a first weight block and a second weight block that are respectively fixed to both ends of the magnetic circuit system, a bearing sleeve is sleeved inside the first weight block and second weight block, a bearing is sleeved inside the bearing sleeve, the first weight block and the second weight block slide and cooperate with the optical axis through the bearing.

As a development, the coil drives the vibrator to strike the first end plate or the second end plate to output a vibration.

As a development, the housing includes a first end plate and a second end plate disposed opposite to each other in the moving direction of the vibrator, the vibrator further includes a first weight block and a second weight block that are respectively fixed to both ends of the magnetic circuit system, the first weight block and the second weight block match the housing to form a guide rail structure, and the vibrator moves along the guide rail structure.

As a development, the guide rail structure includes a guide rail formed by protruding or recessing from an inner top surface and inner bottom surface of the housing, and a sliding portion formed by protruding or recessing from a top and a bottom of the first weight block and second weight block and matching the guide rail.

As a development, the coil drives the vibrator to strike the first end plate or the second end plate to output a vibration.

As a development, an inner side of the first end plate and second end plate are installed with a silicone pad or foam.

The present disclosure has advantageous in that, compared with an existing spring structure, a magnetic interaction force is formed between a restoring assembly and a vibrator to restore a vibrator. In this way, an anti-humidity and anti-high-temperature effect of the restoring assembly is improved by replacing an interaction force of a spring with a magnetic interaction force.

DETAILED DESCRIPTION

A further description is provided on the present disclosure with reference to the drawings and embodiments.

Embodiment 1

Figure 1:
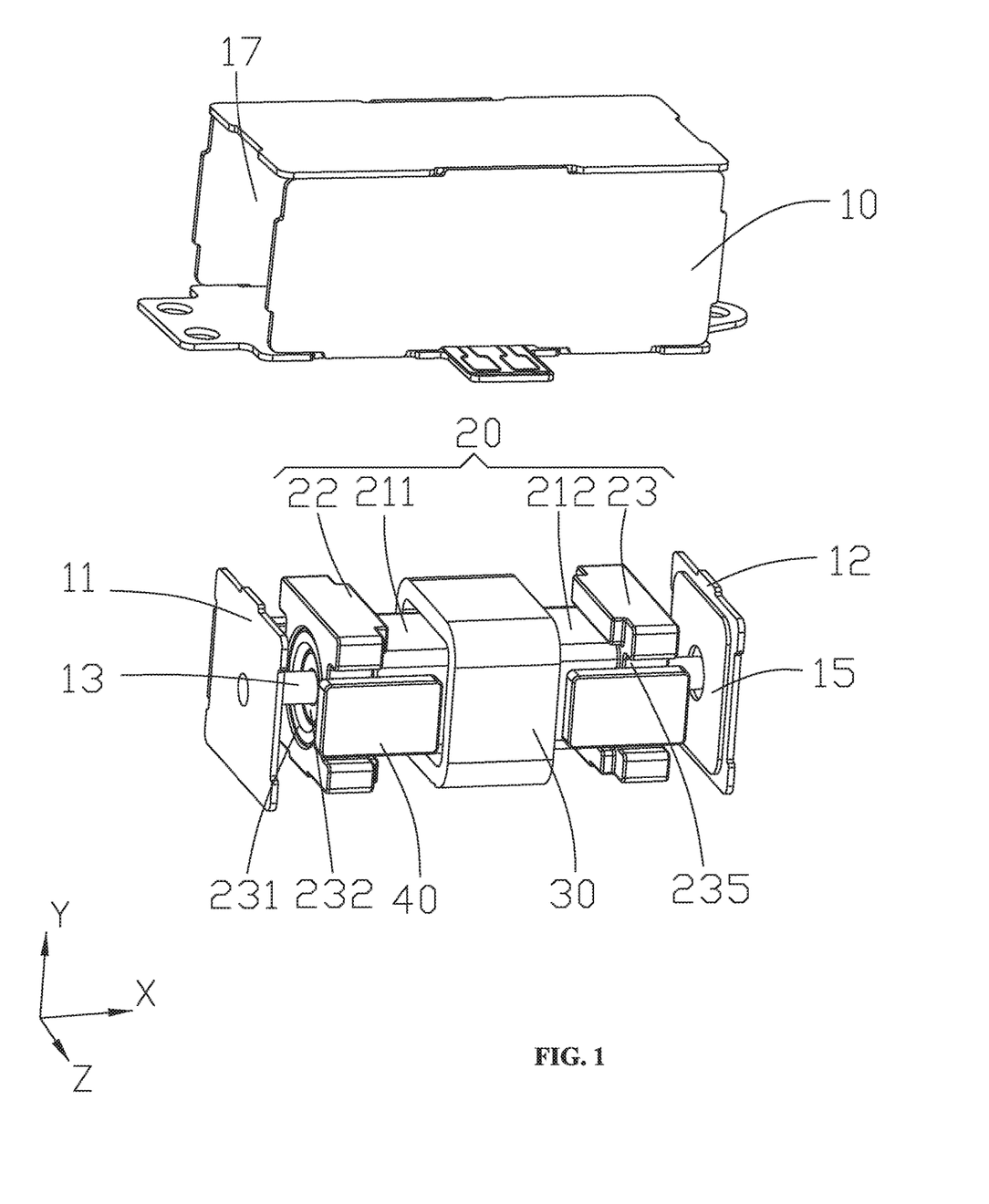
FIG. 1 is a three-dimensional structural view of a linear vibration motor according to an embodiment of the present disclosure.
Figure 2:
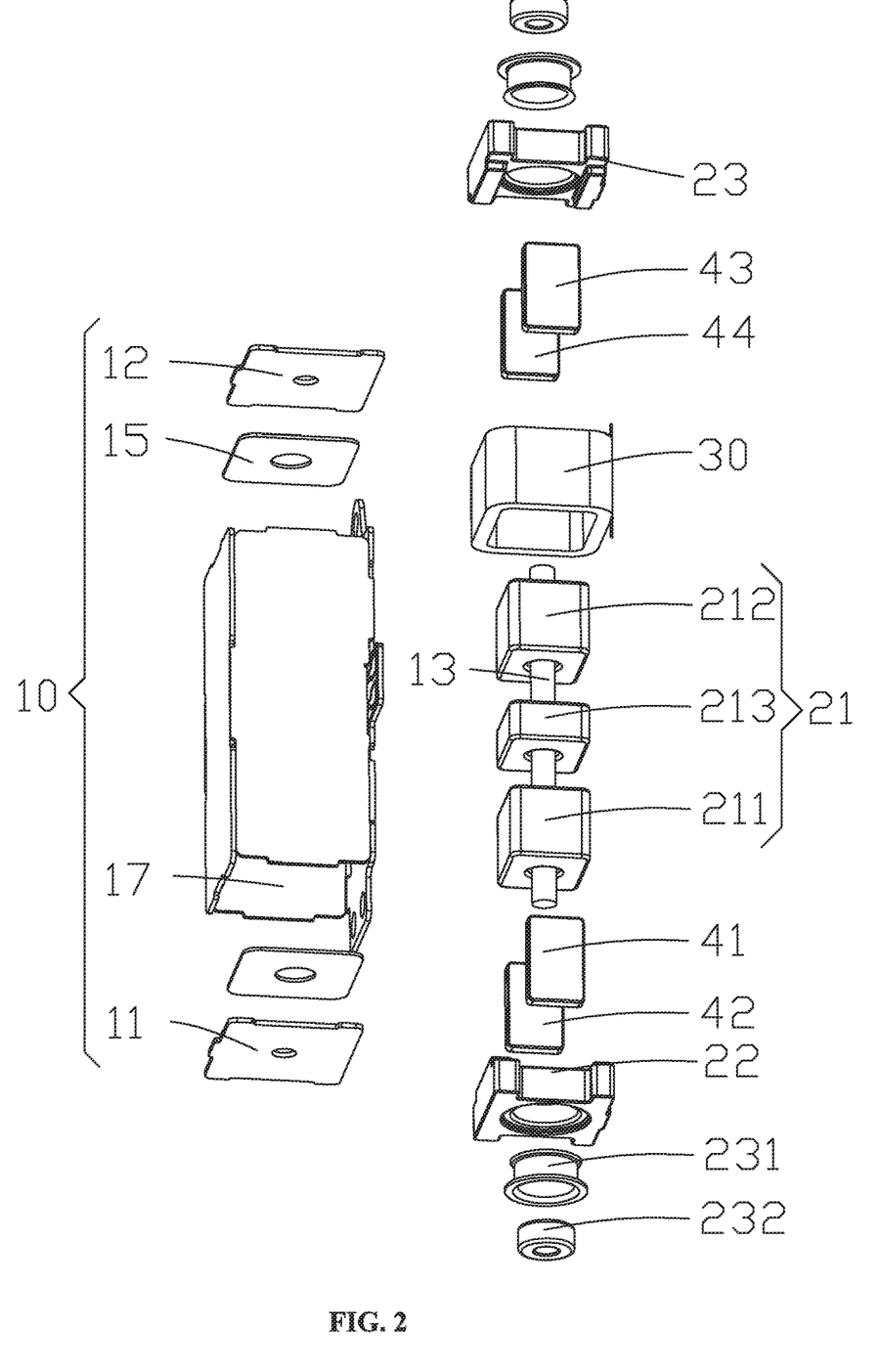
FIG. 2 is a schematic exploded structural view of FIG. 1.

Referring to FIG. 1 and FIG. 2, an embodiment of the present disclosure provides a linear vibration motor including a housing 10 having an accommodating space 17, a vibrator 20 disposed in the accommodating space 17, and a coil 30 fixed in the housing 10 and driving the vibrator 20 to move. The vibrator 20 includes a magnetic circuit system 21. The coil 30 is wound on an outside of the magnetic circuit system 21. The coil 30 is relatively spaced apart from the magnetic system 21. The magnetic circuit system 21 includes a first magnetic steel 211 and a second magnetic steel 212 that are fixedly connected. The first magnetic steel 211 and the second magnetic steel 212 are magnetized in a moving direction of the vibrator 20, the first magnetic steel 211 and the second magnetic steel 212 have identical magnetic poles on their sides opposite to each other. The linear vibration motor further includes a restoring assembly 40 fixed to the housing 10. The restoring assembly 40 magnetizes the magnetic steel in a direction perpendicular to a direction in which the vibrator 20 moves. The restoring assembly has a magnetic pole facing the vibrator. The magnetic pole is identical with the magnetic poles on the opposite sides of the first and second magnetic steels. Preferably, the restoring assembly 40 includes a first restoring member 41 and a second restoring member 42 that are disposed on one side of the coil 30 and that are respectively located on both sides of the magnetic circuit system 21. The first restoring member 41 and the second restoring member 42 have identical magnetic poles on their sides opposite to each other, and the magnetic poles on the opposite sides of the first restoring member 41 and second restoring member 42 are identical with the magnetic poles on the opposite sides of the first magnetic steel 211 and second magnetic steel 212. A magnetic interaction force between the restoring assembly 40 and the magnetic circuit system 21 provides a restoring force for the vibrator 20. Preferably, the magnetic circuit system 21 further includes a pole core 213 fixed between the first magnetic steel 211 and the second magnetic steel 212. It shall be noted that the housing 10 includes a first end plate 11 and a second end plate 12 that are disposed opposite to each other in the moving direction of the vibrator 20. An optical axis 13 is disposed between the first end plate 11 and the second end plate 12. The optical axis 13 is installed in the moving direction of the vibrator 20. The vibrator 20 is sleeved on the optical axis 13 and moves along the optical axis 13. The vibrator 20 further includes a first weight block 22 and a second weight block 23 that are respectively fixed to both ends of the magnetic circuit system 21. A bearing sleeve 231 is sleeved inside the first weight block 22 and second weight block 23. A bearing 232 is sleeved inside the bearing sleeve 231. The first weight block 22 and the second weight block 23 slide and cooperate with the optical axis 13 through the bearing 232. It shall be noted that for the restoring assembly 40, apart from the above preferred embodiment, there may be other embodiments as long as the embodiments satisfy following conditions: the restoring assembly 40 magnetizes the magnetic steel in a direction perpendicular to a direction in which the vibrator 20 moves; the restoring assembly 40 has a magnetic pole facing the vibrator, and the magnetic pole is identical with the magnetic poles on the opposite sides of the first and second magnetic steels 211 and 212. In this way, a magnetic interaction force can be generated between the restoring assembly 40 and the first magnetic steel 211 and/or the second magnetic steel 212. That is, the restoring assembly 40 may further be a ring magnetic steel that is disposed at one or both sides of the coil 30 and that is disposed as surrounding the vibrator 20. The vibrator 20 is moved to a balanced position through the magnetic interaction force between the ring magnetic steel and the first magnetic steel 211 and/or the second magnetic steel 212.

In this embodiment, the coil 30 generates a magnetic field when the coil 30 is powered on. Magnetic fields in different directions are generated according to varied directions of powering to the coil 30. Two magnetic interaction forces in opposite directions are generated between the magnetic fields in different directions and magnetic fields of the first magnetic steel 211 and second magnetic steel 212. The two magnetic interaction forces in opposite directions drive the first weight block 22, the first magnetic steel 211, the pole core 213, the second magnetic steel 212 and the second weight block 23 to perform a reciprocating movement along the axis of the optical axis 13 to output a vibration. It shall be noted that during the reciprocating movement, the vibrator 20 realizes a sliding cooperation between the vibrator 20 and the optical axis 13 through cooperation between the bearing 232 in the first weight block 22 and second weight block 23 and the optical axis 13. Preferably, in order to output a stronger vibration, the first weight block 22, the first magnetic steel 211, the pole core 213, the second magnetic steel 212 and the second weight block 23 output a vibration through the first weight block 22 striking the first end plate 11 and the second weight block 23 striking the second end plate 12. Preferably, the inner side of the first end plate 11 and second end plate 12 is installed with a silicone pad 15 or foam that is configured to buffer the strike of the vibrator 20 to two side walls of the housing 10, thereby protecting the two side walls of the housing.

Figure 3:
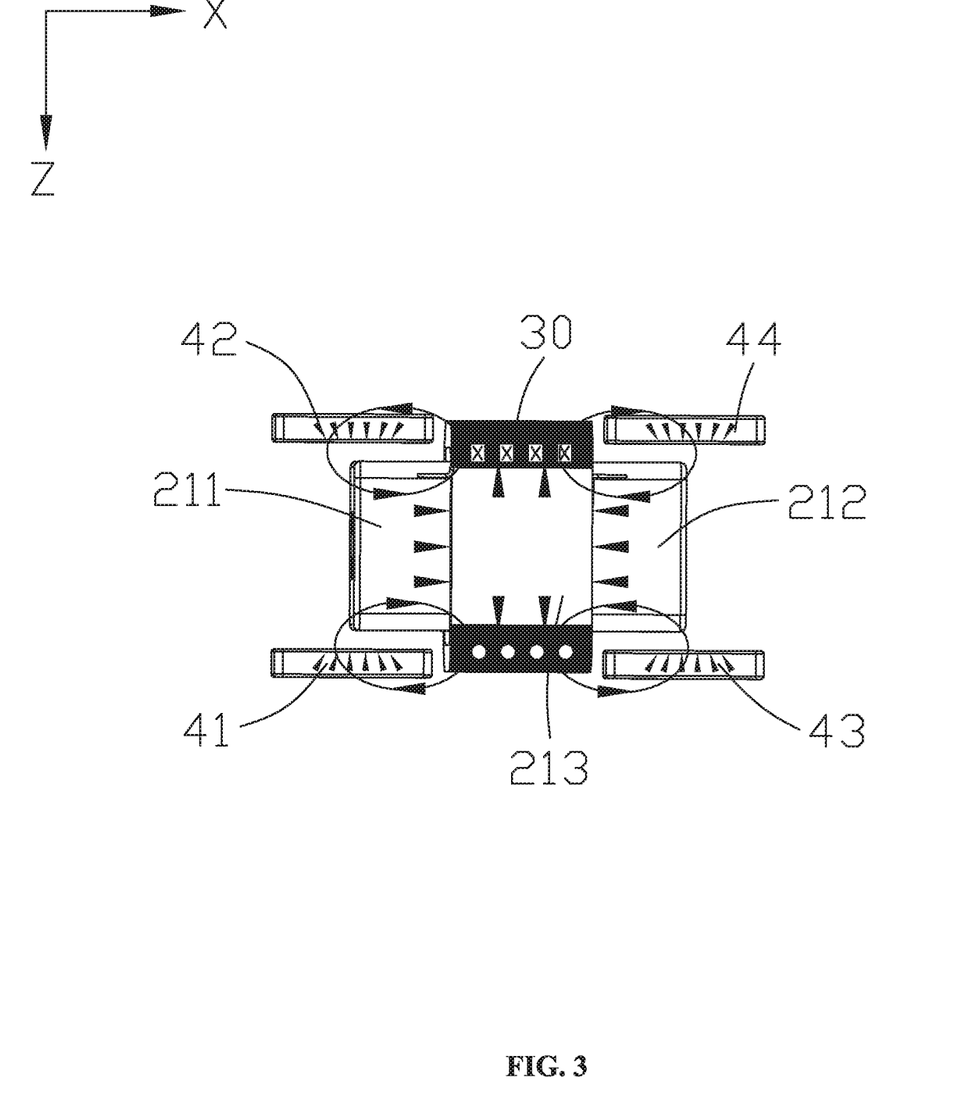
FIG. 3 is a top view of a relationship between a vibrator and a restoring assembly in terms of magnetic flux according to an embodiment of the present disclosure.
Figure 4:
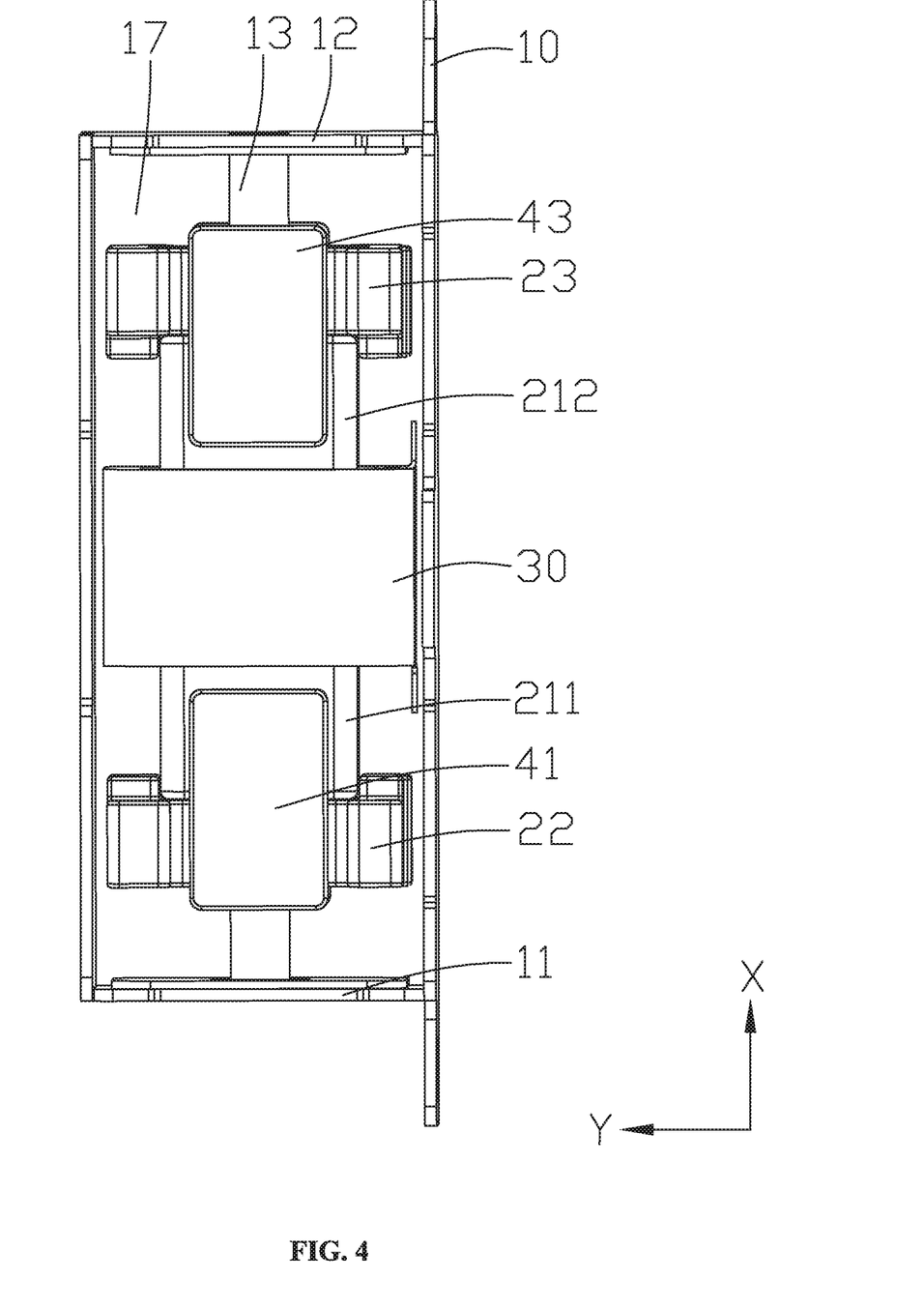
FIG. 4 is a front view of the vibrator and restoring assembly in FIG. 1.

Referring to FIG. 3 and FIG. 4, FIG. 3 illustrates a vertical view (within an XZ plane) of a relationship between the vibrator 20 and the restoring assembly 40 in terms of magnetic flux. FIG. 4 illustrates a front view (within the XZ plane) of the relationship between the vibrator 20 and restoring assembly 40. It shall be noted that the direction that the arrow defines is an N-pole, X denotes a direction in which current flows into the coil 30, O denotes a direction in which current flows out of the coil 30. The first magnetic steel 211 and the second magnetic steel 212 are magnetized in a moving direction of the vibrator 20, and the first magnetic steel 211 and the second magnetic steel 212 have identical magnetic poles on their sides opposite to each other. In this embodiment, the magnetic poles of the first magnetic steel 211 and second magnetic steel 212 on their sides opposite to each other are N-poles. Specifically, the restoring assembly 40 includes a first restoring member 41 and a second restoring member 42 that are disposed on one side of the coil 30 and that are respectively located on both sides of the magnetic circuit system 21. The first restoring member 41 and the second restoring member 42 have identical magnetic poles on their sides opposite to each other, and the magnetic poles on the opposite sides of the first restoring member 41 and second restoring member 42 are identical with the magnetic poles on the opposite sides of the first magnetic steel 211 and second magnetic steel 212. A magnetic interaction force between the restoring assembly 40 and the magnetic circuit system 21 provides a restoring force for the vibrator 20. Preferably, the restoring assembly 40 further includes a third restoring member 43 and a fourth restoring member 44 that are disposed on the other side of the coil 30 and that are respectively located on both sides of the magnetic circuit system 21. The third restoring member 43 and the fourth restoring member 44 have identical magnetic poles on their sides opposite to each other. The magnetic poles on the opposite sides of the third restoring member 43 and fourth restoring member 44 are identical with the magnetic poles on the opposite sides of the first magnetic steel 211 and second magnetic steel 212. The first restoring member 41, the second restoring member 42, the third restoring member 43 and the fourth restoring member 44 are fixed in the housing 10. The restoring assembly 40 does not contact the first magnetic steel 211 or the second magnetic steel 212. Preferably, a left-end surface (negative direction of the X axis) of the first magnetic steel 211 extends into and is located at the middle portion of the first restoring member 41 and second restoring member 42 in the direction of the X axis, a right-end surface (positive direction of the X axis) of the second magnetic steel 211 extends into and is located at the middle portion of the third restoring member 43 and fourth restoring member 44. Magnetic poles of the first restoring member, second restoring member 42, third restoring member 43 and fourth restoring member 44, the magnetic poles close to the vibrator 20, are N poles.

A moving process of the vibrator 20 within the housing 10 is described specifically in the following. When the coil 30 is powered on through a flexible circuit board, the flexible circuit board fixedly installed in the housing 10, and the current flows in between the second restoring member 42 and the fourth restoring member 44 in the XZ plane, and flows out between the first restoring member 41 and the third restoring member 43, the first magnetic steel 211 and the second magnetic steel 212 generate a magnetic field that is approximately elliptical. The magnetic field passes through the pole core 213. On top of the pole core 213 (that is, the negative direction of the Z axis), the direction of the magnetic field is outward along the top of the pole core 213. Similarly, at the bottom of the pole core 213 (that is, the positive direction of the Z axis), the direction of the magnetic field is outward along the bottom of the pole core 213. The direction of the magnetic field that the coil 30 is subjected to is determined and the direction of the current in the coil 30 is also determined. According to the left-hand rule, it may be obtained that the coil 30 bears the Lorentz force F to the right. According to Newton's third law of motion, the vibrator 20 is subjected to the Lorentz force F to the left. At this time, the vibrator 20 slides axially along the optical axis 13 through the bearing 232 inside the first weight block 22 and the second weight block 23, and then the first weight block 22 approaches the first end cover 11. Similarly, a movement direction of the vibrator 20 when current flows in between the first restoring member 41 and the third restoring member 43 on the XZ plane and flows out between the second restoring member 42 and the fourth restoring member 44 after the coil 30 is powered on is known, and thereby forming a reciprocating movement to output a vibration, which is not described in detail. Preferably, in order to output a stronger vibration, the vibrator 20 outputs a vibration through the first weight block 22 striking the first end plate 11 and the second weight block 22 striking the second end plate 12.

An operation process of the restoring assembly 40 is described in the following: the first restoring member 41 and the second restoring member 42 are subjected to a first magnetic interaction force by the first magnetic steel 211; the third restoring member 43 and the fourth restoring member 44 are subjected to a second magnetic interaction force by the second magnetic steel 212, the first magnetic interaction force and the second magnetic interaction force cooperate with each other, so that the vibrator 20 enables the bearing 232 in the first weight block 22 and second weight block 23 in the vibrator 20 to slide along and cooperate with the optical axis 13 in the accommodating space 17. Then the vibrator 20 is moved to a balanced position to complete a restoring action. The magnetic interaction force formed between the restoring assembly 40 and the vibrator 20 not only provides a restoring force when the vibrator 20 restores, but also holds the vibrator 20.

Figure 5:
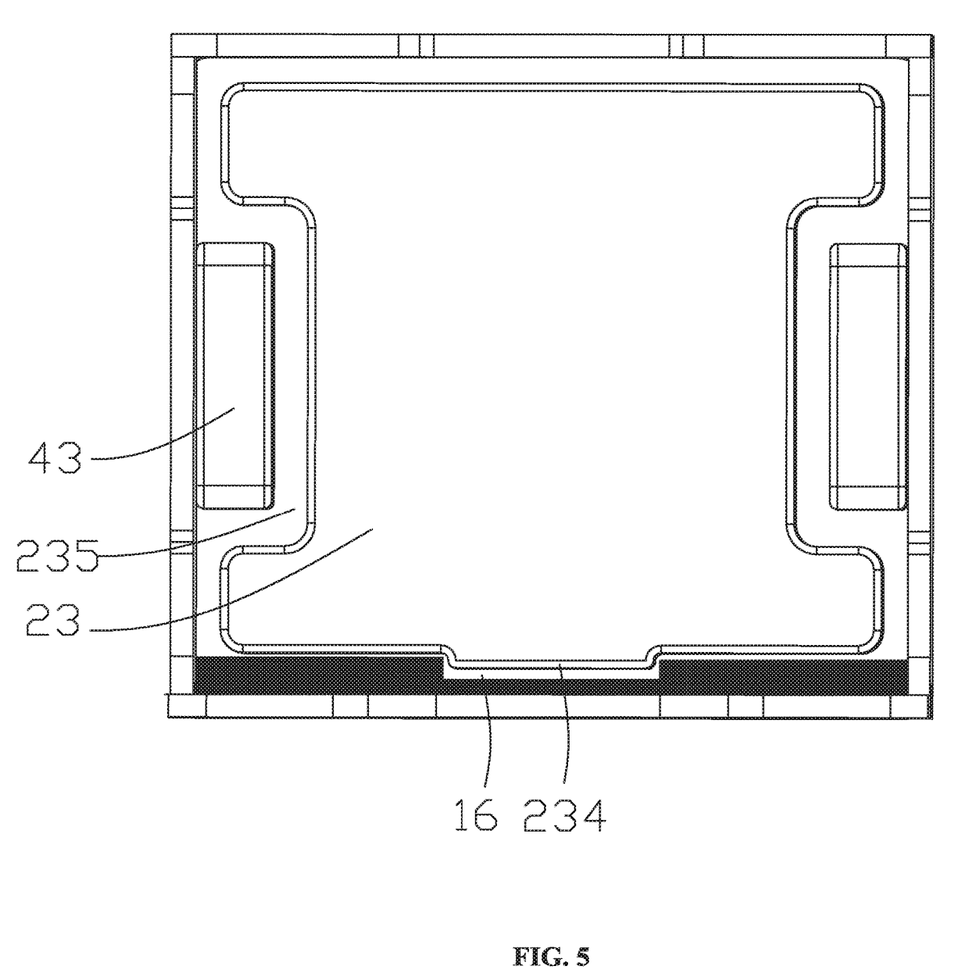
FIG. 5 is a right view of a part of a second weight block and cover plate in FIG. 1.

Referring to FIG. 5, bottoms and/or tops of the first weight block 22 and second weight block 23 protrude outwards or depress downwards to form a limiting portion 234. A cover plate is provided with a matching portion 16 that slides and cooperates with the limiting portion 234, which may limit a track of movement of the vibrator 20 in the housing 10 and has an effect of correction. Specifically, the limiting portion is a protruding platform, and the limiting portion 16 is a limiting groove that slides and cooperates with the protruding platform. Two side surfaces of the first weight block 22 and second weight block 23 are provided with a groove 235 for accommodating the restoring assembly 40. When the vibrator 20 moves in the housing 10, the restoring assembly 40 passes through the groove 235, thereby saving space.

Embodiment 2

Another embodiment of the present disclosure provides a linear vibration motor including a housing 10 having an accommodating space 17, a vibrator 20 disposed in the accommodating space 17, and a coil 30 fixed in the housing 10 and driving the vibrator 20 to move. The vibrator 20 includes a magnetic circuit system 21. The coil 30 is wound on an outside of the magnetic circuit system 21. The coil 30 is relatively spaced apart from the magnetic system 21. The magnetic circuit system 21 includes a first magnetic steel 211 and a second magnetic steel 212 that are fixedly connected. The first magnetic steel 211 and the second magnetic steel 212 are magnetized in a moving direction of the vibrator 20. The magnetic pole of the restoring assembly, the magnetic pole facing the vibrator, is identical with magnetic poles of the first magnetic steel and second magnetic steel on opposite sides of the first magnetic steel and second magnetic steel. The first magnetic steel 211 and the second magnetic steel 212 have identical magnetic poles on their sides opposite to each other. The linear vibration motor further includes a restoring assembly 40 fixed to the housing 10. The restoring assembly 40 magnetizes the magnetic steel in a direction perpendicular to a direction in which the vibrator 20 moves. Preferably, the magnetic circuit system 21 further includes a pole core 213 fixed between the first magnetic steel 211 and the second magnetic steel 212.

Referring to FIG. 3, FIG. 3 illustrates a top view (within an XZ plane) of a relationship between the vibrator 20 and the restoring assembly 40 in terms of magnetic flux. It shall be noted that the direction that the arrow defines is an N-pole, X denotes a direction in which current flows into the coil 30, and O denotes a direction in which current flows out of the coil 30. The first magnetic steel 211 and the second magnetic steel 212 are magnetized in a moving direction of the vibrator 20, and the first magnetic steel 211 and the second magnetic steel 212 have identical magnetic poles on their sides opposite to each other. The magnetic pole of the restoring assembly, the magnetic pole facing the vibrator, is identical with magnetic poles of the first magnetic steel and second magnetic steel on opposite sides of the first magnetic steel and second magnetic steel. It shall be noted that the housing 10 includes a first end plate 11 and a second end plate 12 that are disposed opposite to each other in the moving direction of the vibrator 20. The vibrator 20 further includes a first weight block 22 and a second weight block 23 that are respectively fixed to both ends of the magnetic circuit system 21. The first weight block 22 and the second weight block 23 match the housing 10 to form a guide rail 14 structure, and the vibrator 20 moves along the guide rail 14 structure. Specifically, the guide rail 14 structure includes a guide rail 14 formed by protruding or recessing from an inner top surface and inner bottom surface of the housing 10, and a sliding portion 233 formed by protruding or recessing from a top and a bottom of the first weight block 22 and second weight block 23 and matching the guide rail 14. In this embodiment, the magnetic poles of the first magnetic steel 211 and second magnetic steel 212 on their sides opposite to each other are N-poles. A relationship of powers between the vibrator 20 and the restoring assembly 40 before and after the coil 30 is powered on is described specifically in the following. Preferably, the restoring assembly 40 includes a first restoring member 41 and a second restoring member 42 that are disposed on one side of the coil 30 and that are respectively located on both sides of the magnetic circuit system 21. The first restoring member 41 and the second restoring member 42 have identical magnetic poles on their sides opposite to each other, and the magnetic poles on the opposite sides of the first restoring member 41 and second restoring member 42 are identical with the magnetic poles on the opposite sides of the first magnetic steel 211 and second magnetic steel 212. A magnetic interaction force between the restoring assembly 40 and the magnetic circuit system 21 provides a restoring force for the vibrator 20. Preferably, the restoring assembly 40 further includes a third restoring member 43 and a fourth restoring member 44 that are disposed on the other side of the coil 30 and that are respectively located on both sides of the magnetic circuit system 21. The third restoring member 43 and the fourth restoring member 44 have identical magnetic poles on their sides opposite to each other. The magnetic poles on the opposite sides of the third restoring member 43 and fourth restoring member 44 are identical with the magnetic poles on the opposite sides of the first magnetic steel 211 and second magnetic steel 212. It shall be indicated that for the restoring assembly 40, apart from the above preferred embodiment, there may be other embodiments as long as the embodiments satisfy the following: the restoring assembly 40 magnetizes the magnetic steel in a direction perpendicular to a direction in which the vibrator 20 moves; the restoring assembly 40 has a magnetic pole facing the vibrator, and the magnetic pole is identical with the magnetic poles on the opposite sides of the first and second magnetic steels 211 and 212. In this way, a magnetic interaction force may be generated between the restoring assembly 40 and the first magnetic steel 211 and/or the second magnetic steel 212. That is, the restoring assembly 40 may further be a ring magnetic steel that is disposed at one or both sides of the coil 30 and that is disposed as surrounding the vibrator 20. The vibrator 20 is moved to a balanced position through the magnetic interaction force between the ring magnetic steel and the first magnetic steel 211 and/or the second magnetic steel 212.

The first restoring member 41, the second restoring member 42, the third restoring member 43 and the fourth restoring member 44 are fixed in the housing 10. The restoring assembly 40 does not contact the first magnetic steel 211 or the second magnetic steel 212. Preferably, a left-end surface (negative direction of the X axis) of the first magnetic steel 211 extends into and is located at the middle portion of the first restoring member 41 and second restoring member 42 in the direction of the X axis, and a right-end surface (positive direction of the X axis) of the second magnetic steel 211 extends into and is located at the middle portion of the third restoring member 43 and fourth restoring member 44. Magnetic poles of the first restoring member 41, second restoring member 42, third restoring member 43 and fourth restoring member 44, the magnetic poles close to the vibrator 20, are N poles.

A moving process of the vibrator 20 within the housing 10 is described specifically in the following. When the coil 30 is powered on through a flexible circuit board, the flexible circuit board fixedly installed in the housing 10, and the current flows in between the second restoring member 42 and the fourth restoring member 44 in the XZ plane, and flows out between the first restoring member 41 and the third restoring member 43, the first magnetic steel 211 and the second magnetic steel 212 generate a magnetic field that is approximately elliptical. The magnetic field passes through the pole core 213. On top of the pole core 213 (that is, the negative direction of the Z axis), the direction of the magnetic field is outward along the top of the pole core 213. Similarly, at the bottom of the pole core 213 (that is, the positive direction of the Z axis), the direction of the magnetic field is outward along the bottom of the pole core 213. The direction of the magnetic field that the coil 30 is subjected to is determined and the direction of the current in the coil 30 is also determined. According to the left-hand rule, it may be obtained that the coil 30 is subjected to the Lorentz force F to the right. According to Newton's third law of motion, the vibrator 20 is subjected to the Lorentz force F to the left. At this time, the sliding portion 233 at the top and bottom of the first weight block 22 and second weight block 23 in the vibrator 20 slides along the guide rail 14 on the inner top surface and inner bottom surface of the housing 10, and then the first weight block 22 approaches the first end cover 11. Similarly, a movement direction of the vibrator 20 when current flows in between the first restoring member 41 and the third restoring member 43 on the XZ plane and flows out between the second restoring member 42 and the fourth restoring member 44 after the coil 30 is powered on is known, and thereby forming a reciprocating movement to output a vibration, which is not described in detail. Preferably, in order to output a stronger vibration, the vibrator 20 outputs a vibration through the first weight block 22 striking the first end plate 11 and the second weight block 22 striking the second end plate 12.

An operation process of the restoring assembly 40 is described in the following: the first restoring member 41 and the second restoring member 42 are subjected to a first magnetic interaction force by the first magnetic steel 211; the third restoring member 43 and the fourth restoring member 44 are subjected to a second magnetic interaction force by the second magnetic steel 212, the first magnetic interaction force and the second magnetic interaction force cooperate with each other. Under the first magnetic interaction force and the second magnetic interaction force, the sliding portion 233 on the top portion and bottom portion of the first weight block 22 and second weight block 23 slides and cooperates with the guide rail 14 at the inner top surface and inner bottom surface of the housing. Then the vibrator 20 is moved to a balanced position to complete a restoring action. The magnetic interaction force formed between the restoring assembly 40 and the vibrator 20 not only provides a restoring force when the vibrator 20 restores, but also holds the vibrator 20.

Figure 6:
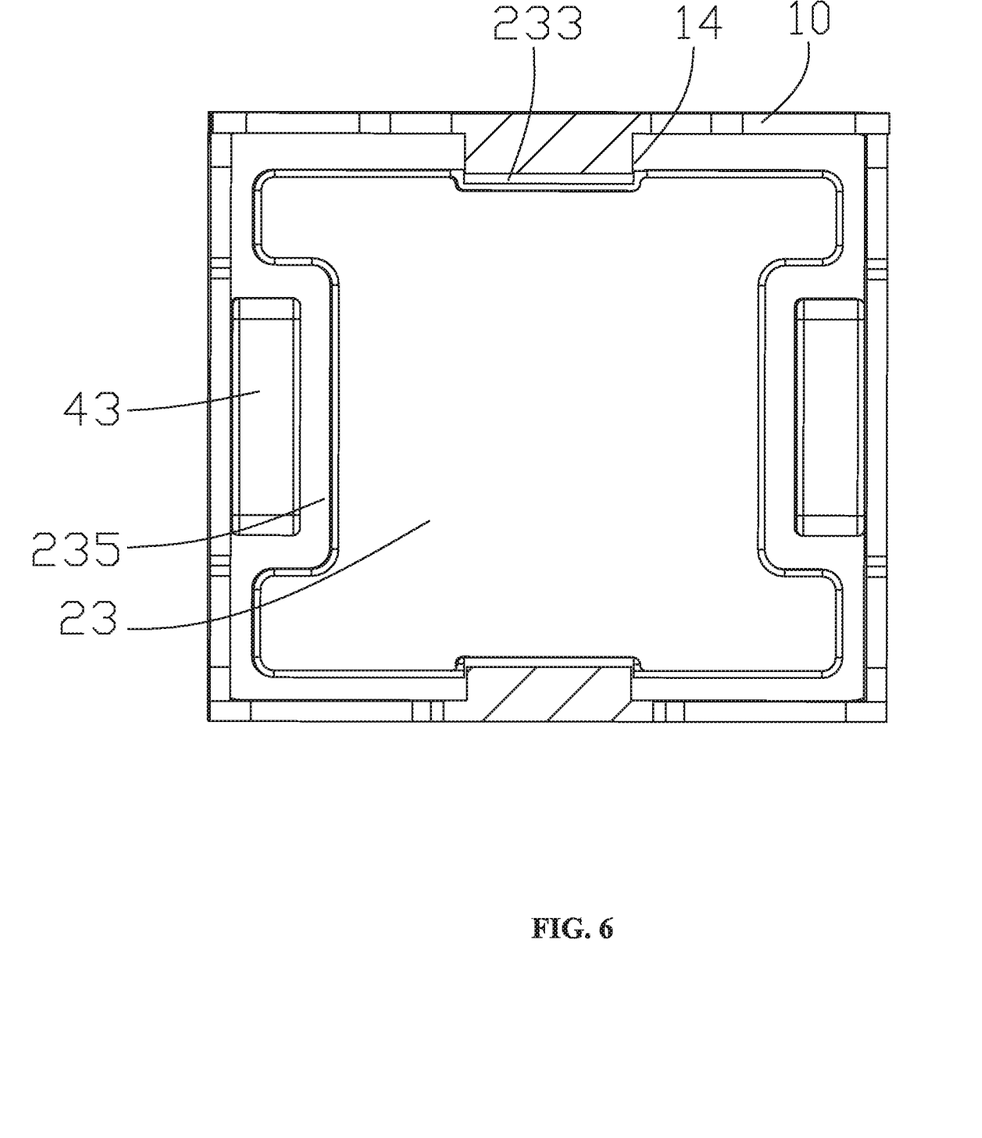
FIG. 6 is a structural right view of a part of the vibrator and housing of the linear vibration motor according to another embodiment of the present disclosure.

Referring to FIG. 6, it shall be noted that during the reciprocating movement, the vibrator 20 forms the sliding portion 233 through depressions or protrusions at the top or bottom of the first weight block 22 and second weight block 23. Protrusions and depressions at the inner top surface and inner bottom surface of the housing 10 form a guide rail 14. The sliding portion 233 and the guide rail 13 cooperate to realize a sliding cooperation between the vibrator 20 and the guide rail 14. Preferably, in order to output a stronger vibration, the first weight block 22, the first magnetic steel 211, the pole core 213, the second magnetic steel 212 and the second weight block 23 output a vibration through the first weight block 22 striking the first end plate 11 and the second weight block 23 striking the second end plate 12.

Preferably, the inner side of the first end plate 11 and second end plate 12 is installed with a silicone pad 15 or foam that is configured to buffer the strike of the vibrator 20 to two side walls of the housing 10, thereby protecting the two side walls of the housing 10. Two side surfaces of the first weight block 22 and second weight block 23 are provided with a groove 235 for accommodating the restoring assembly 40. When the vibrator 20 moves in the housing 10, the restoring assembly 40 passes through the groove 235, thereby saving space.

It shall be noted that in the present disclosure, all directional expressions (such as up, down, inner, outer, top, bottom, etc.) are merely used for explaining relationships of relevant locations between different parts under a certain circumstance (as shown in the drawings). If a circumstance changes, a directional expression changes also.

It shall be noted that when an element is expressed as "fixed to" or "disposed in" another element, the former element may be directly on the other element, or there may be a third element in between. When an element is expressed as "connected to" another element, the former element may be directly connected to the other element, or there may be a third element in between.

The above are only embodiments of the present disclosure. It shall be indicated that those of ordinary skill in the art can make improvements without departing from the creative concept of the present disclosure, and these belong to the protection scope of the present disclosure.

What is claimed is:

1. A linear vibration motor, comprising,
  a housing having an accommodating space,
  a vibrator disposed in the accommodating space, and
  a coil fixed in the housing and driving the vibrator to move;
  the vibrator comprising a magnetic circuit system, the coil is wound on an outside of the magnetic circuit system and is relatively spaced apart from the magnetic circuit system;
  the magnetic circuit system comprising a first magnetic steel and a second magnetic steel that are fixedly connected; the first magnetic steel and the second magnetic steel are magnetized in a moving direction of the vibrator, and the first magnetic steel and the second magnetic steel have identical magnetic poles on their sides opposite to each other;
  wherein the linear vibration motor further comprises a restoring assembly fixed to the housing, the restoring assembly is magnetic steel and magnetizes in a direction perpendicular to a direction in which the vibrator moves; the restoring assembly has a magnetic pole facing the vibrator, the magnetic pole being identical with the magnetic poles on the opposite sides of the first and second magnetic steels, and a magnetic interaction force between the restoring assembly and the magnetic circuit system provides a restoring force for the vibrator;
  the housing comprises a first end plate and a second end plate that are disposed opposite to each other in the moving direction of the vibrator;
  an optical axis is installed between the first end plate and the second end plate, the optical axis disposed in the moving direction of the vibrator, the two ends of the optical axis along the moving direction are respectively connected with the first end plate and the second end plate, and the vibrator is sleeved on the optical axis and moves along the optical axis; the vibrator further comprises a first weight block and a second weight block that are respectively fixed to both ends of the magnetic circuit system; the first weight block and the second weight block are respectively arranged at the ends of the magnetic circuit system close to the first end plate and the second end plate and are separated from the first end plate and the second end plate respectively, the coil is located between the first weight block and the second weight block;
  a bearing sleeve is sleeved inside the first weight block and second weight block, a bearing is sleeved inside the bearing sleeve; the first weight block and the second weight block slide and cooperate with the optical axis through the bearing; the coil drives the vibrator to strike the first end plate or the second end plate to output a vibration.

2. The linear vibration motor according to claim 1, wherein the restoring assembly is a ring magnetic steel disposed at one or both sides of the coil and arranged as surrounding the vibrator.

3. The linear vibration motor according to claim 1, wherein the restoring assembly comprises a first restoring member and a second restoring member that are disposed on one side of the coil and that are respectively located on both sides of the magnetic circuit system;
  the first restoring member and the second restoring member have identical magnetic poles on their sides opposite to each other, the magnetic poles on the opposite sides of the first restoring member and second restoring member are identical with the magnetic poles on the opposite sides of the first magnetic steel and second magnetic steel.

4. The linear vibration motor according to claim 3, wherein the restoring assembly further comprises a third restoring member and a fourth restoring member that are disposed on the other side of the coil and that are respectively located on both sides of the magnetic circuit system;
  the third restoring member and the fourth restoring member have identical magnetic poles on their sides opposite to each other, the magnetic poles on the opposite sides of the third restoring member and fourth restoring member are identical with the magnetic poles on the opposite sides of the first magnetic steel and second magnetic steel.

5. The linear vibration motor according to claim 1, wherein the magnetic circuit system further comprises a pole core fixed between the first magnetic steel and the second magnetic steel.

6. The linear vibration motor according to claim 1, wherein
the first weight block and the second weight block match the housing to form a guide rail structure, and the vibrator moves along the guide rail structure.

7. The linear vibration motor according to claim 6, wherein the guide rail structure comprises a guide rail formed by protruding or recessing from an inner top surface and inner bottom surface of the housing, and a sliding portion formed by protruding or recessing from a top and a bottom of the first weight block and second weight block and matching the guide rail.

8. The linear vibration motor according to claim 1, wherein an inner side of the first end plate and second end plate are installed with a silicone pad or foam.

9. The linear vibration motor according to claim 6, wherein an inner side of the first end plate and second end plate are installed with a silicone pad or foam.

* * * * *